(12) United States Patent
Yafouz

(10) Patent No.: US 10,183,562 B2
(45) Date of Patent: Jan. 22, 2019

(54) CAR COVER SYSTEM

(71) Applicant: Marwan Ahmed Mohammed Yafouz, Jeddah at Sharfiah (SA)

(72) Inventor: Marwan Ahmed Mohammed Yafouz, Jeddah at Sharfiah (SA)

( * ) Notice: Subject to any disclaimer, the term of this patent is extended or adjusted under 35 U.S.C. 154(b) by 0 days.

(21) Appl. No.: 15/726,822

(22) Filed: Oct. 6, 2017

(65) Prior Publication Data

US 2018/0029456 A1    Feb. 1, 2018

Related U.S. Application Data

(63) Continuation-in-part of application No. 14/965,229, filed on Dec. 10, 2015, now Pat. No. 9,783,034.

(51) Int. Cl.
*B60J 11/02* (2006.01)
*B60J 7/08* (2006.01)
*B60J 11/04* (2006.01)

(52) U.S. Cl.
CPC .............. *B60J 11/02* (2013.01); *B60J 7/085* (2013.01); *B60J 11/04* (2013.01)

(58) Field of Classification Search
CPC . B60J 11/025; B60J 7/085; B60J 11/04; B60J 11/02
USPC .................................................. 296/95.1
See application file for complete search history.

(56) References Cited

U.S. PATENT DOCUMENTS

| | | | |
|---|---|---|---|
| 7,331,131 B2 * | 2/2008 | Staples ................... | G09F 21/04 40/413 |
| 8,267,035 B2 * | 9/2012 | Hamilton ............... | B60Q 7/005 116/28 R |
| 9,701,185 B1 * | 7/2017 | Usanga .................. | B60J 11/02 |
| 9,908,394 B2 * | 3/2018 | Romero Regalado ....................... | B60J 11/025 |
| 2005/0028912 A1 * | 2/2005 | Schnarr .................. | B60R 11/00 150/166 |

* cited by examiner

*Primary Examiner* — Pinel E Romain

(57) ABSTRACT

A container is located within a vehicle. The container having a chamber there within and an opening to provide access to the chamber. The cover has a central portion positionable over the upper extent of a vehicle. The cover has a periphery, a front edge, a left edge, a right edge, and a rear edge. The rear edge includes a tail of a reduced width terminating in an interior point within the chamber. A plurality of suction cups are attached to the periphery of the cover along the front edge, rear edge, left edge and right edge. The suction cups are removably coupleable to the vehicle.

10 Claims, 3 Drawing Sheets

CAR COVER SYSTEM

RELATED APPLICATION

The present application is a continuation-in-part application of U.S. patent application Ser. No. 14/965,229 filed Dec. 10, 2015, issuing Oct. 10, 2017 as U.S. Pat. No. 9,783,034, the subject matter of which is incorporated herein by reference and the priority of which is hereby claimed.

BACKGROUND OF THE INVENTION

Field of the Invention

The present invention relates to a car cover system and more particularly pertains to shielding a vehicle from environmental damage through a cover and for maintaining the cover coupled to the vehicle at all times in a safe, convenient, and economical manner.

Description of the Prior Art

The use of vehicle covers of known designs and configurations is known in the prior art. More specifically, vehicle covers of known designs and configurations previously devised and utilized for the purpose of protecting vehicles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe car cover system that allows shielding a vehicle from environmental damage through a cover and for maintaining the cover coupled to the vehicle at all times in a safe, convenient, and economical manner.

In this respect, the car cover system according to the present invention substantially departs from the conventional concepts and designs of the prior art, and in doing so provides an apparatus primarily developed for the purpose of shielding a vehicle from environmental damage through a cover and for maintaining the cover coupled to the vehicle at all times in a safe, convenient, and economical manner.

Therefore, it can be appreciated that there exists a continuing need for a new and improved car cover system which can be used for shielding a vehicle from environmental damage through a cover and for maintaining the cover coupled to the vehicle at all times in a safe, convenient, and economical manner. In this regard, the present invention substantially fulfills this need.

SUMMARY OF THE INVENTION

In view of the foregoing disadvantages inherent in the known types of vehicle covers of known designs and configurations now present in the prior art, the present invention provides an improved car cover system. As such, the general purpose of the present invention, which will be described subsequently in greater detail, is to provide a new and improved car cover system and method which has all the advantages of the prior art and none of the disadvantages.

From a broad perspective, to attain this, the present invention essentially comprises a container located within a vehicle. The container having a chamber there within and an opening to provide access to the chamber. The cover has a central portion positionable over the upper extent of a vehicle. The cover has a front edge, a left edge, a right edge, and a rear edge. The rear edge includes a tail of a reduced width terminating in an interior point within the chamber. A plurality of suction cups are attached to the cover along the front edge, rear edge, left edge and right edge. The suction cups are removably coupleable to the vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved car cover system which has all of the advantages of the prior art vehicle covers of known designs and configurations and none of the disadvantages.

It is another object of the present invention to provide a new and improved car cover system which may be easily and efficiently manufactured and marketed.

It is further object of the present invention to provide a new and improved car cover system which is of durable and reliable constructions.

An even further object of the present invention is to provide a new and improved car cover system which is susceptible of a low cost of manufacture with regard to both materials and labor, and which accordingly is then susceptible of low prices of sale to the consuming public, thereby making such car cover system economically available to the buying public.

Lastly, it is an object of the present invention to provide a car cover system for shielding a vehicle from environmental damage through a cover and for maintaining the cover coupled to the vehicle at all times in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
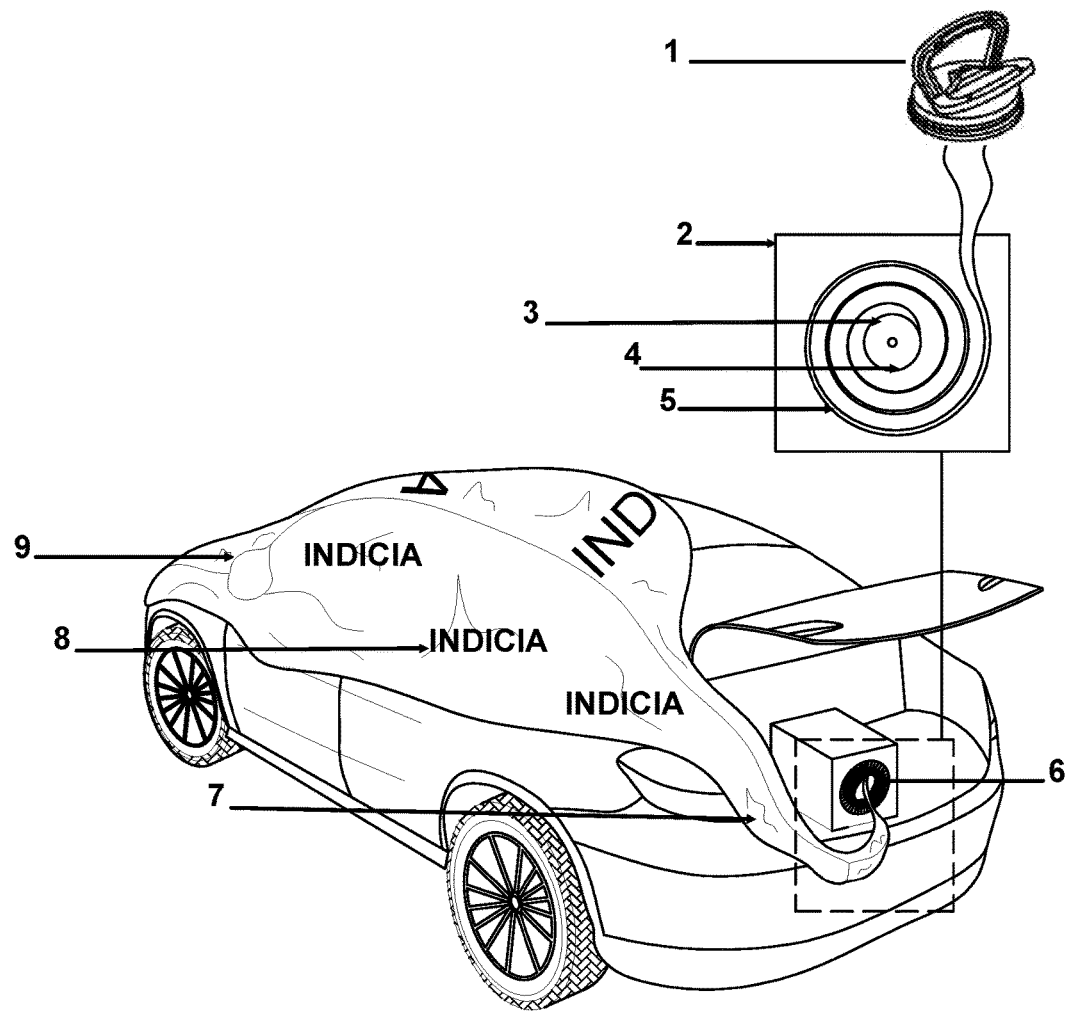
FIG. 1 is an exploded perspective illustration of a vehicle covering system constructed in accordance with the principles of the present invention.
Figure 2:
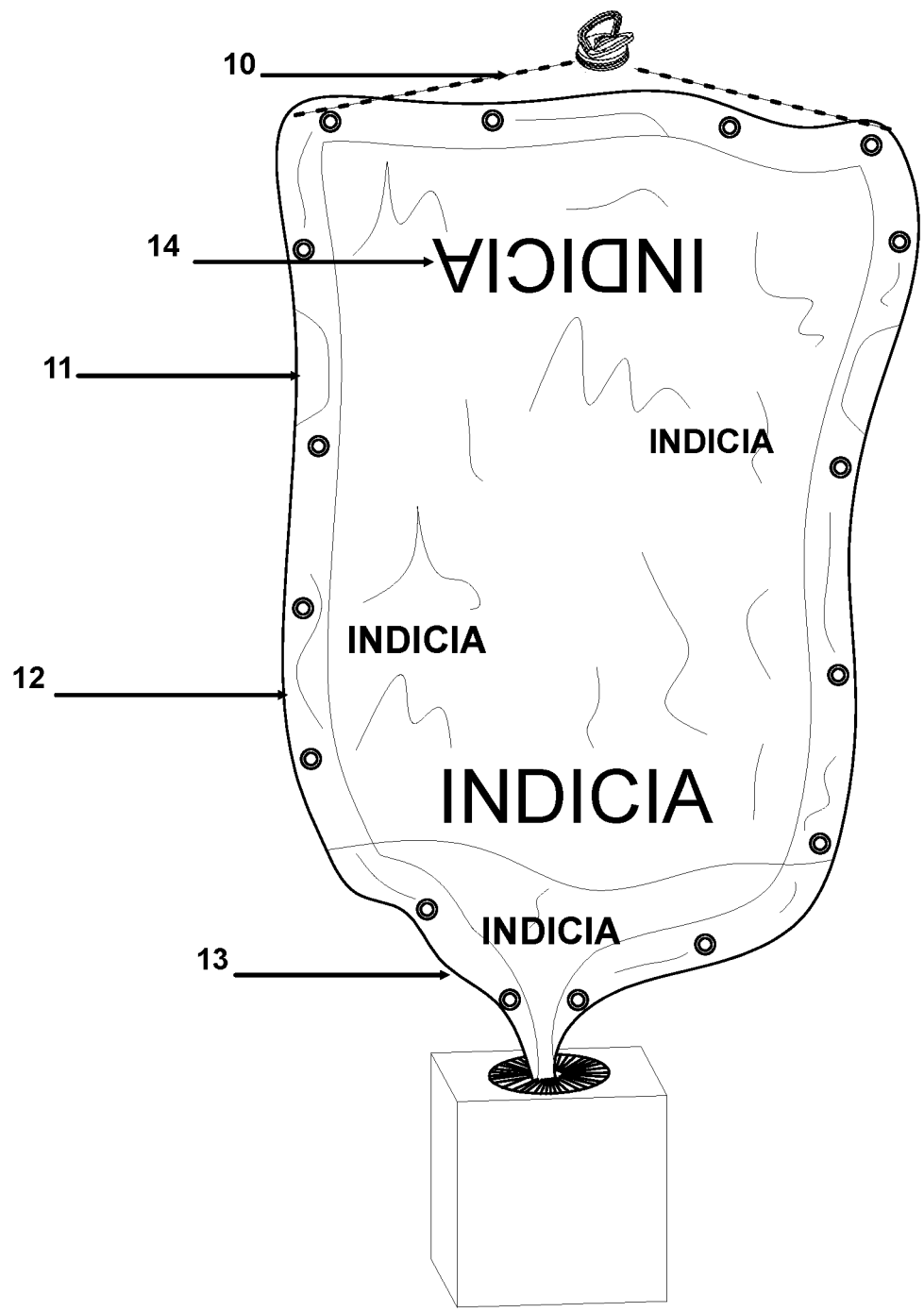
FIG. 2 is a front elevational view of the cover and the container shown in FIG. 1 with the cover partially withdrawn from the container.
Figure 3:
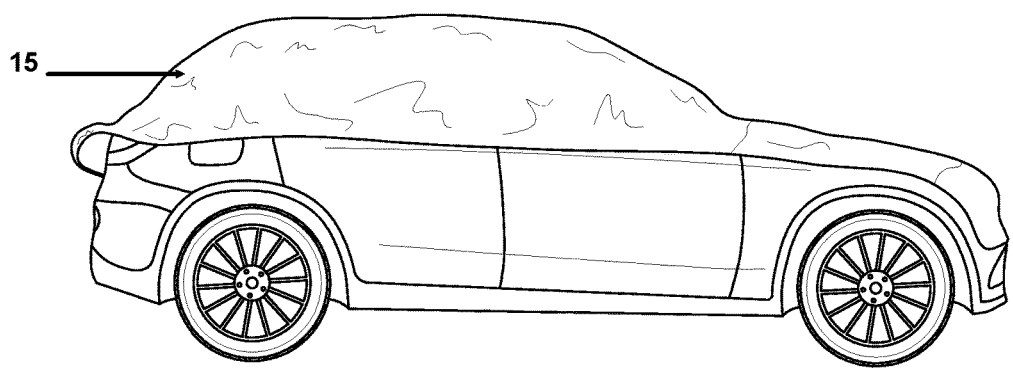
FIG. 3 is a side elevational view of a vehicle of FIG. 1 with the cover over the upper extent of the vehicle and operatively coupled thereto.

With reference now to the drawings, and in particular to FIG. 1 thereof, the preferred embodiment of the new and improved car cover system embodying the principles and concepts of the present invention will be described.

The present invention, the car cover system is comprised of a plurality of components. Such components in their broadest context include a container, a cover, and a plurality of suction cups. Such components are individually configured and correlated with respect to each other so as to attain the desired objective.

The car covering system is for shielding a car from environmental damage through a cover and for maintaining the cover coupled to the car at all times. The shielding and the maintaining are done in a safe, convenient, and economical manner.

In the preferred embodiment, first provided is a car. The car has a front forwardly, a back rearwardly, a left side, and a right side. The car has an upper extent with glass in the front and the back and the left side and the right side. The car has a lower extent below the glass. The car has a trunk in the rear.

Next provided is a container 2 located within the trunk. A fastener couples the container in the trunk. A chamber is within the container. The container has a circular opening 6 to provide access to the chamber. A lid with a handle 1 is provided exteriorly of the chamber. The lid is threadedly coupled to the circular opening. The lid has a circular recipient surface interiorly of the chamber.

A cover is next provided. The cover has a central portion positionable over the upper extent of the car and positionable over a portion of the lower extent of the car. The cover has a periphery 12. The cover has a front edge 10 positionable over the lower extent of the car in the front. The lid with the handle is attached to the front edge of the cover. The cover has a left edge positionable over the lower extent of the car on the left side. The cover has a right edge positionable over the lower extent of the car on the right side. The cover has a rear edge 13 positionable over the lower extent of the car in the back. The rear edge of the cover includes a tail 7 of a reduced width terminating in an interior point within the chamber. Indicia 8, 14 is provided on the cover.

Next provided are a plurality of suction cups. The suction cups are attached to the periphery 12 of the cover along the front edge, the rear edge, the left edge, and the right edge. The plurality of suction cups are removably coupleable to the lower extent of the car when in an operative orientation.

Lastly, a short shaft is provided within the chamber. The short shaft is rotatable about a horizontal axis of rotation. The interior point of the rear edge of the cover is attached to the short shaft. Two springs 3, 4 are operatively coupled to the short shaft. The springs are adapted to rotate the short shaft and coil up the cover to form a coil 5 within the chamber. In this manner, the system will assume an inoperative orientation. The lid with the handle and the cover are adapted to be pulled out of the chamber and the trunk and held against the lower extent of the car by the suction cups when in the operative orientation.

The suction cups function to hold the cover on the front and on the rear and on the left side and on the right side of the car The container is preferably in the form of a rectilinear box that will be secured in the trunk of the car and be secured there either by screws, adhesive tape, glue, or the like. The cover is made from a thin, light-weight durable material. The box may come in a cylindrical shape also.

Inside the container is a thin pipe (short shaft) and from both sides the pipe is attached to two springs 3, 4 that will allow the pipe to rotate back automatically. The pipe will be thin and made from a durable and light-weight material.

The cover is made from a material that is fire retardant, waterproof, wrinkle resistant, tear resistant, printable and heat resistant. The cover can be detached from the box (container) easily for washing or changing without the need for buying a new box. Alternately, the material may be stretchable.

As an option, a brush is provided that will clean the cover from dust and a pocket beneath the brush to collect the dust. The pocket is removable for cleaning.

The springs on both sides of the thin pipe may be removed for repairing or changing without the need of changing the box if the springs are loose.

To use the cover and protect the car, the cover will be pulled from the side to the front and the user will place the mirror space(s) 9, 11, pockets or holes, around the associated side mirror(s) and go back to the trunk and close the trunk which will close on a very small tail 7 of the cover.

The cover will have indicia 8, 14 all over it visible to people or it will have fashionable print.

The indicia can be printed all over the fabric sides, back, top and front.

Formed in the cover are spaces for mirrors, pockets 9 or holes 11 to go around the mirrors.

The car will be covered from the sides with the same fabric or ventilated fabric or the same fabric with ventilation holes or slots.

At the rear end, the fabric will have a small shape where at the end it will be so small, about 6 centimeter, so the trunk could close easily with no problems.

The car cover can be made in three deferent shapes based on customer needs. First, a half side cover for protection from heat mostly. This covers the whole side glass, only half the side glass plus there will be spaces between from the side for ventilation, one between the front glass and hood so the air can circulate from both sides, and one between the rear glass and the trunk so that the air can circulate from the sides.

Second, a full glass cover for winter and rainy weather, same as drawing with no ventilation.

Third, a full car cover for long period parking. This will cover the whole car for longer period parking.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle covering system comprising:
   a container located within a vehicle, the container having a chamber there within and an opening to provide access to the chamber;
   a cover having a central portion positionable over the vehicle, the cover having a front edge, a left edge, a right edge, and a rear edge, the rear edge including a tail of a reduced width terminating in an interior point within the chamber; and
   a plurality of suction cups attached to the cover peripherally along the front edge, rear edge, left edge and right edge, the plurality of suction cups removably coupleable to the vehicle.

2. The system as set forth in claim 1 wherein the vehicle is a car with an upper extent including glass, the vehicle having a lower extent below the glass for removably receiving the suction cups.

3. The system as set forth in claim 1 and further including:
   a short shaft within the chamber rotatable about a horizontal axis of rotation, the interior point of the rear edge of the cover being attached to the short shaft, two springs operatively coupled to the short shaft adapted to rotate the short shaft and coil up the cover within the chamber whereby the system will assume an inoperative orientation, the cover adapted to be pulled out of the chamber and held against a lower extent of the vehicle by the suction cups when in an operative orientation.

4. The system as set forth in claim 2 wherein the cover is a half cover adapted to cover the upper extent of the car.

5. The system as set forth in claim 2 wherein the cover is a full cover adapted to entirely cover the car.

6. The system as set forth in claim 2 wherein the cover is a half side cover adapted to cover a side of the car.

7. The system as set forth in claim 2 and further including spaces in the cover for ventilation.

8. The system as set forth claim 2 wherein the cover is formed of a stretchable fabric.

9. A car covering system for shielding a car from environmental damage through a cover and for maintaining the cover coupled to the car at all times, the system comprising, in combination:
   the car having a front forwardly, a back rearwardly, a left side, and a right side, the car having an upper extent with glass in the front and the back and the left side and the right side, the car having a lower extent below the glass, the car having a trunk in the back;
   a container (2) located within the trunk, a fastener coupling the container in the trunk, the container having a chamber there within, the container having a circular opening (6) to provide access to the chamber, a lid with a handle (1) exteriorly of the chamber threadedly coupled to the circular opening, the lid having a circular recipient surface interiorly of the chamber;
   a cover having a central portion positionable over the upper extent of the car and positionable over a portion of the lower extent of the car, the cover having a periphery (12), a front edge (10) positionable over the lower extent of the car in the front, the lid and handle (1) attached to the front edge, the cover having a left edge positionable over the lower extent of the car on the left side, the cover having a right edge positionable over the lower extent of the car on the right side, the cover having a rear edge (13) positionable over the lower extent of the car in the back, the rear edge including a tail (7) of a reduced width terminating in an interior point within the chamber, indicia (8)(14) on the cover;
   a plurality of suction cups attached to the periphery (12) of the cover along the front edge and the rear edge and the left edge and the right edge of the cover, the plurality of suction cups removably coupled to the lower extent of the car when in an operative orientation; and
   a short shaft within the chamber rotatable about a horizontal axis of rotation, the interior point of the rear edge of the cover being attached to the short shaft, two springs (3)(4) operatively coupled to the short shaft adapted to rotate the short shaft forming the cover into a coil (5) within the chamber whereby the system will assume an inoperative orientation, the lid with the handle and the cover adapted to be pulled out of the chamber and the trunk and held against the lower extent of the car by the suction cups when in the operative orientation.

10. The system as set forth in claim 8 and further including at least one mirror space (9)(11).

* * * * *